(12) United States Patent
Qin et al.

(10) Patent No.: US 10,508,931 B2
(45) Date of Patent: Dec. 17, 2019

(54) MOTOR AND RESOLVER THEREOF

(71) Applicant: Johnson Electric S.A., Murten (CH)

(72) Inventors: Rui Feng Qin, Hong Kong (CN); Cheng Shun Du, Shenzhen (CN); Ning Sun, Shenzhen (CN); Xing Liu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 254 days.

(21) Appl. No.: 15/423,925

(22) Filed: Feb. 3, 2017

(65) Prior Publication Data

US 2017/0219385 A1 Aug. 3, 2017

(30) Foreign Application Priority Data

Feb. 3, 2016 (CN) .......................... 2016 1 0078267

(51) Int. Cl.

| | |
|---|---|
| *H02K 11/00* | (2016.01) |
| *G01D 5/20* | (2006.01) |
| *H02K 11/01* | (2016.01) |
| *H02K 11/225* | (2016.01) |
| *B62D 5/04* | (2006.01) |
| *B62D 6/10* | (2006.01) |
| *H02K 5/22* | (2006.01) |

(52) U.S. Cl.
CPC .......... *G01D 5/204* (2013.01); *B62D 5/0463* (2013.01); *B62D 6/10* (2013.01); *G01D 5/2046* (2013.01); *H02K 5/225* (2013.01); *H02K 11/01* (2016.01); *H02K 11/225* (2016.01)

(58) Field of Classification Search
CPC ........ H02K 11/225; H02K 11/01; H02K 1/24; G01D 5/20
USPC .......................................................... 310/68 B
See application file for complete search history.

(56) References Cited

U.S. PATENT DOCUMENTS

| | | | | |
|---|---|---|---|---|
| 4,631,510 | A  * | 12/1986 | Nagarkatti | ............. H02K 29/12 310/168 |
| 7,030,532 | B2 * | 4/2006 | Kobayashi | ............. H02K 24/00 310/168 |
| 2005/0122097 | A1 * | 6/2005 | Kitazawa | ............. G01D 5/2046 324/207.17 |
| 2006/0226719 | A1 * | 10/2006 | Nakanishi | ................ H02K 7/20 310/68 B |
| 2009/0179529 | A1 * | 7/2009 | Makino | ................ B62D 5/0403 310/68 B |

* cited by examiner

*Primary Examiner* — Hanh N Nguyen
(74) *Attorney, Agent, or Firm* — Muncy, Geissler, Olds & Lowe, P.C.

(57) ABSTRACT

The invention relates to a motor and a resolver thereof. The resolver includes a resolver stator (70), a resolver rotor (80). The resolver includes (70) a plurality of resolver stator teeth (73) and resolver stator windings (75) wound around the resolver stator teeth (73). The resolver rotor (75) includes a resolver rotor core (81) received in a space surrounded by the resolver stator teeth (73) and capable of rotating around a shaft axis. The resolver stator windings (75) includes first output windings wound around each of the resolver stator teeth (73) by a first number of turns, second output windings wound around each of the resolver stator teeth by a second number of turns, and exciting windings wound around each resolver stator teeth by a third number of turns.

13 Claims, 7 Drawing Sheets

C-C

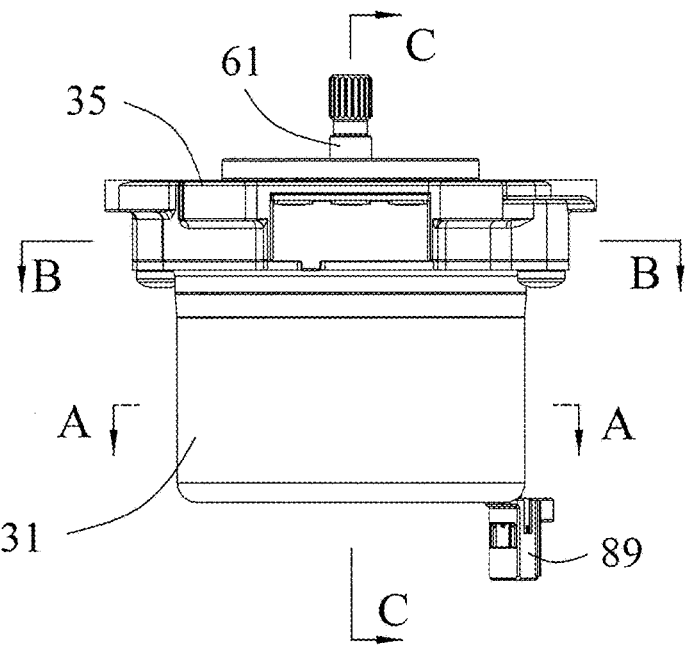
Fig. 4
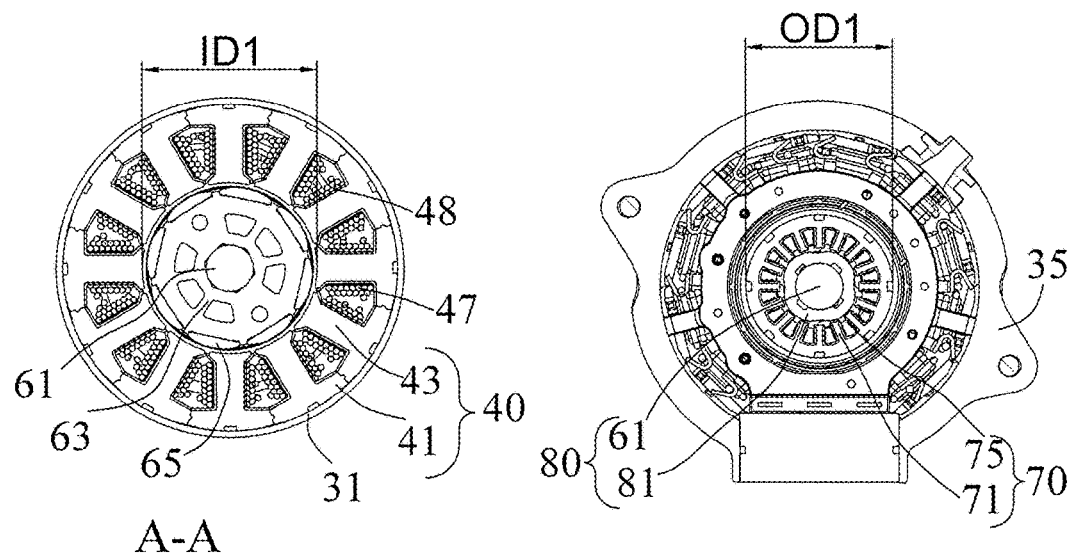
A-A
Fig. 5
B-B
Fig. 6

MOTOR AND RESOLVER THEREOF

CROSS REFERENCE TO RELATED APPLICATIONS

This non-provisional patent application claims priority under 35 U.S.C. § 119(a) from Patent Application No. 201610078267.1 filed in The People's Republic of China on Feb. 3, 2016.

FIELD OF THE INVENTION

The present invention relates to a resolver and a motor using the same. The motor is particularly applicable in an electric power steering (EPS) system.

BACKGROUND OF THE INVENTION

EPS systems are used to electrically assist a driver of an automobile to steer a vehicle.

An EPS system typically uses a resolver to accurately detect rotor position of a motor. It is desirable that a resolver has more accurate detection of rotor position. However, various factors may affect the detection accuracy. For example, magnetic field generated by windings current of the motor may significantly affect the detection accuracy of the resolver.

SUMMARY OF THE INVENTION

In a first aspect of the present invention there is provided a resolver having a resolver stator and a resolver rotor. The resolver stator includes a plurality of resolver stator teeth and resolver stator windings wound around the resolver stator teeth. The resolver rotor includes a resolver rotor core received in a space surrounded by the resolver stator teeth and capable of rotating around a shaft axis. The resolver stator windings includes a plurality of first output windings wound around each of the resolver stator teeth by a first number of turns, a plurality of second output windings wound around each of the resolver stator teeth by a second number of turns, and a plurality of exciting windings wound around each resolver stator teeth by a third number of turns.

Preferably, the third number of turns is less than the first number of turns and/or the second number of turns.

Preferably, the first number of turns is equal to the second number of turns.

Preferably, the number of the resolver stator teeth is 2n, wherein n is an integer greater than 1; the 2n resolver stator teeth are divided into n pairs of resolver stator teeth, each of the n pairs comprising two adjacent resolver stator teeth with first output windings wound thereon in a same direction; for every two adjacent pairs of the n pairs, the first output windings are wound in opposite directions.

Preferably, for the two resolver stator teeth of each pair of resolver stator teeth, the first output windings and the second output windings are wound on one resolver stator tooth in a same winding direction, the first output windings and the second output windings are wound on the other resolver stator tooth (73) in opposite winding directions respectively.

Preferably, for every three adjacent resolver stator teeth, the second output windings are wound on two adjacent teeth of the three resolver stator teeth in a same winding direction, and wound on the rest resolver stator tooth in an opposite winding direction.

Preferably, the exciting windings are wound on the resolver stator teeth in CW direction and CCW direction alternatively.

Preferably, wherein the resolver rotor core is in an annular shape, and the outer radius R at any one point of peripheral surface of the resolver rotor core meets:

$$R = R_s - \frac{a}{b + \sin(p\theta)}$$

Wherein, $$a = \left[2 + \frac{2(R_s - R_{max})}{R_{max} - R_{min}}\right](R_s - R_{max})$$

$$b = 1 + 2\frac{R_s - R_{max}}{R_{max} - R_{min}}$$

$R_S$ is an inner radius of the resolver stator core,
$R_{max}$ is a maximum outer radius of the resolver rotor core,
$R_{min}$ is a minimum outer radius of the resolver rotor core,
$\theta$ is an angle position of the any one point; and
p is the number of pole pairs of the resolver rotor core.

In a second aspect of the present invention there is provided a motor having a motor stator, a motor rotor rotatably mounted in the motor stator through a shaft, and a resolver described above. The motor stator includes a plurality of motor stator teeth and motor stator windings wound around the motor stator teeth. The resolver stator is mounted to the motor stator, and the resolver rotor is fixed to the shaft.

The motor further includes a shield fixed between the motor stator and the resolver for eliminating or weakening magnetic interference from the motor stator.

Preferably, the shield includes an tubular portion surrounding the resolver stator.

Preferably, the tubular portion includes a bottom having a through hole for the shaft to pass through.

Preferably, the tubular portion has an opening end and a flange at the opening end; the flange is mounted to the motor stator.

Preferably, the flange is provided with a mounting hole for a fastener to pass through to fix the shield onto to the motor stator.

In a third aspect of the present invention there is provided a resolver having a resolver stator and a resolver rotor. The resolver stator includes a plurality of resolver stator teeth and resolver stator windings wound around the resolver stator teeth. The resolver rotor is received in the resolver stator teeth, and comprising a resolver rotor core capable of rotating around a shaft axis and; wherein the resolver rotor core is in an annular shape, and the outer radius R at any one point of peripheral surface of the resolver rotor core meets:

$$R = R_s - \frac{a}{b + \sin(p\theta)}$$

Wherein, $$a = \left[2 + \frac{2(R_s - R_{max})}{R_{max} - R_{min}}\right](R_s - R_{max})$$

$$b = 1 + 2\frac{R_s - R_{max}}{R_{max} - R_{min}}$$

$R_S$ is an inner radius of the resolver stator core,
$R_{max}$ is a maximum outer radius of the resolver rotor core,
$R_{min}$ is a minimum outer radius of the resolver rotor core,
$\theta$ is an angle position of the any one point; and p is the number of pole pairs of the resolver rotor core.

In a fourth aspect of the present invention there is provided a motor having a motor stator, a motor rotor rotatably mounted in the motor stator through a shaft, and a resolver described above.

BRIEF DESCRIPTION OF THE DRAWINGS

Various embodiments of the present invention are described, by way of example only, with reference to the drawings, in which identical or related structures, elements, or parts may be labeled with the same reference numerals throughout the figures. Dimensions of components and features shown in the figures are generally chosen for convenience and clarity of presentation and are not necessarily to scale.

FIG. 4 is a side view of the motor of FIG. 2;

FIG. 5 is a sectional view of the motor of FIG. 4, along A-A;

FIG. 6 is a sectional view of the motor of FIG. 4, along B-B;

DETAILED DESCRIPTION OF VARIOUS EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

Figure 1:
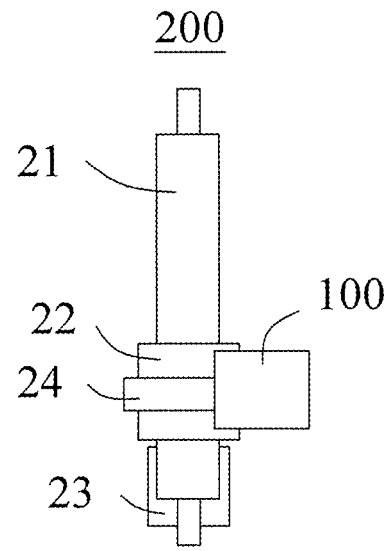
FIG. 1 schematically illustrates an electric power steering system according to one embodiment of the present invention.

Referring to FIG. 1, the electric power steering system 200 according to one embodiment of the present invention includes a shaft 21 (such as, a shaft capable of being driven by a steering wheel), a sensor 22 for detecting the steering force applied to the shaft 21, a control unit 23 for calculating and controlling the magnitude of the required assisting power based on the detection result of the sensor 22, a motor 100 controlled by the control unit 23 and a reduction gear train 24 for decelerating the output of the motor 100.

Figure 2:
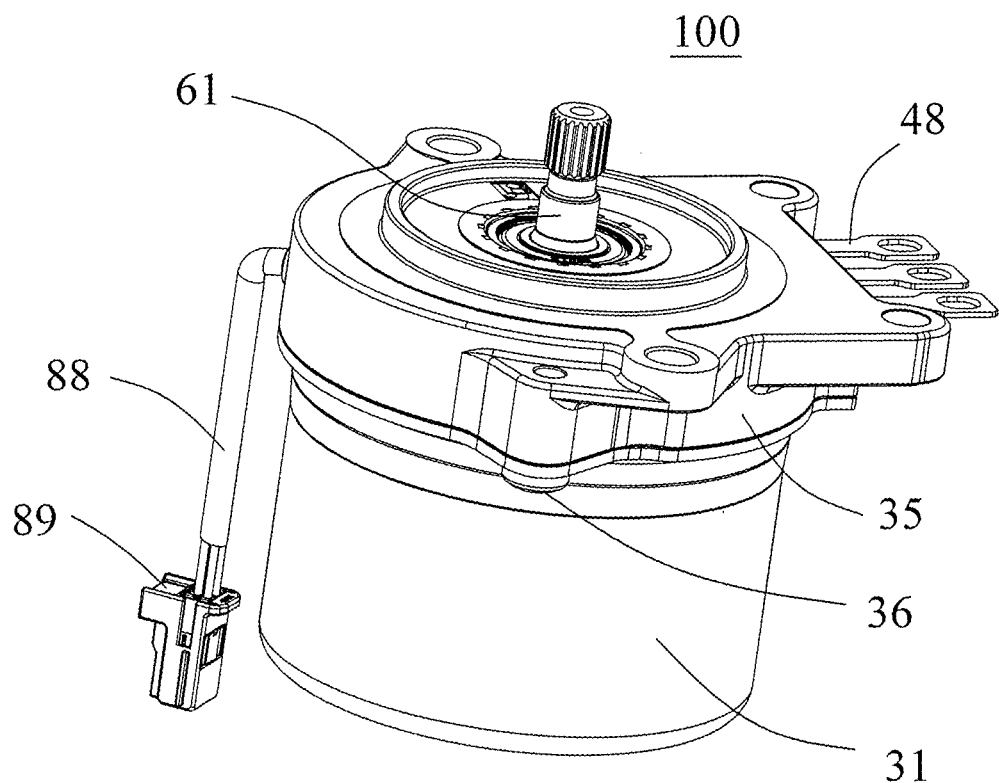
FIG. 2 is an isometric view of a motor used in the electric power steering system of FIG. 1.
Figure 3:
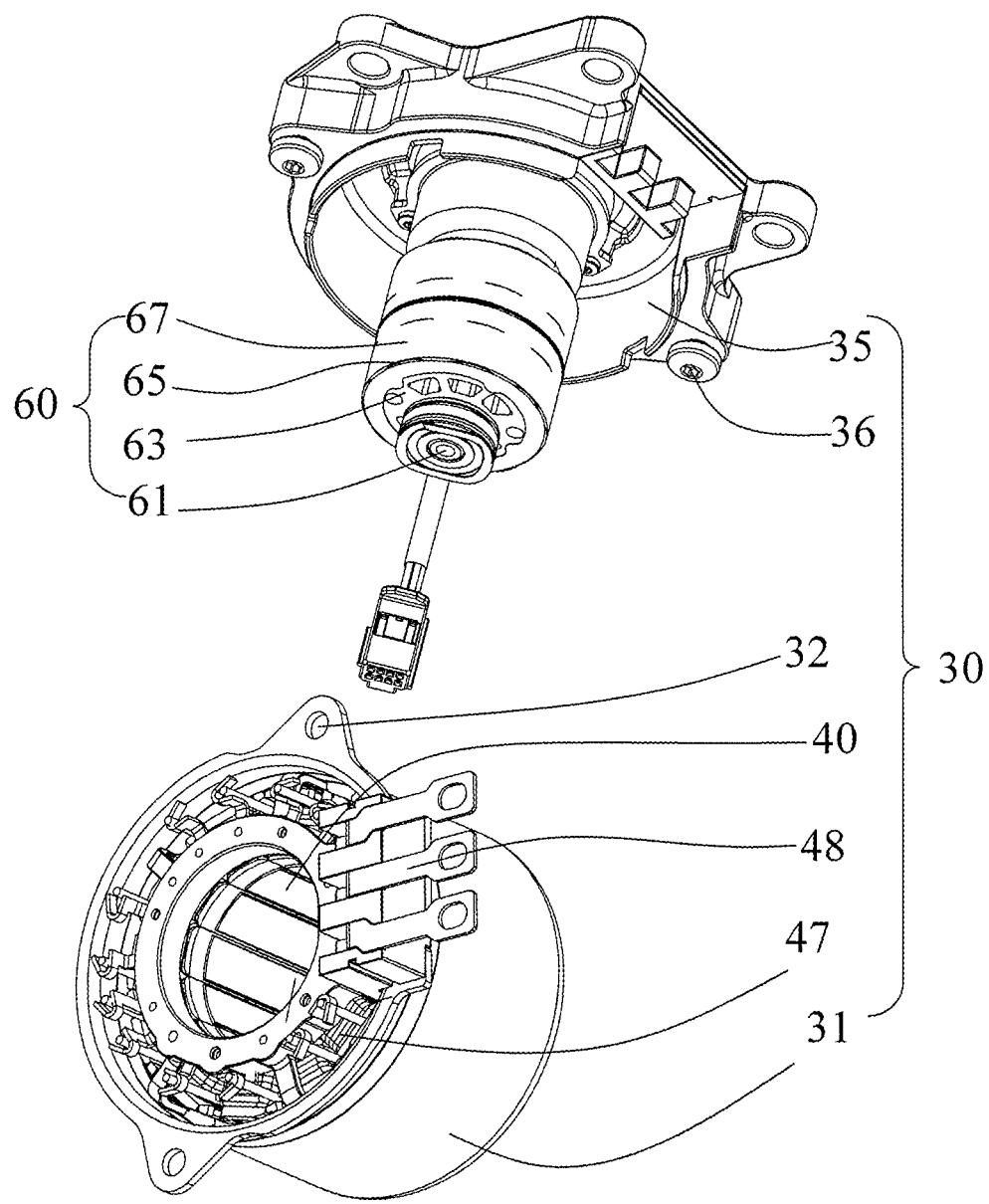
FIG. 3 is an exploded view of the motor of FIG. 2.

Referring FIG. 2 and FIG. 3, the motor 100 includes a motor stator 30 and a motor rotor 60. The motor stator 30 includes a cylindrical housing 31 having an opening end, an end plate 35 mounted at the opening end of the housing 31, and a stator core 40 made of magnetic materials mounted at an inner wall of the housing 31 and motor stator windings 47 thereof. The motor stator windings 47 are connected to power source (not shown) by terminals 48. As is illustrated in FIG. 5, the stator core 40 includes an annular yoke 41, a plurality of motor stator teeth 43 extending inwardly from the annular yoke 41, and an insulating bobbin 48 installed on the motor stator teeth 43 to separate the motor stator core 40 and the motor stator windings 47, thus insulating the motor stator windings 47 from the motor stator core 40. The motor stator windings 47 are wound around the insulated bobbin 48 to form windings around the motor stator teeth 43. In this embodiment, the motor stator windings 47 are concentrated windings, that is, each coil of the motor stator windings 47 is wound around one motor stator tooth 43.

Referring FIG. 3 to FIG. 5, the motor rotor 60 includes a shaft 61, a motor rotor core 63 fixed onto the shaft 61, permanent magnets 65 fixed to the motor rotor core 63 and a protective sleeve 67 surrounding the motor rotor core 63 and the magnets 65. The motor rotor 60 is rotatably mounted to the motor stator 30. Specifically, a bottom of the housing 31 and the end plate 35 of the motor stator 30 are respectively equipped with two bearings such as rolling bearings for supporting the shaft 61, so that the motor rotor 60 can rotate with respect to the motor stator 30. In this embodiment, the motor 100 is a brushless motor. After the motor 100 is energized, the motor stator windings 47 generates magnetic field interacting with the motor rotor 60 to therefore drive the motor rotor 60 to rotate.

Referring to FIG. 4 to FIG. 6, the motor 100 is further equipped with a resolver including a resolver stator 70 and a resolver rotor 80. The resolver is located between the motor stator core 40 and the motor end plate 35. The resolver is connected to power source of control unit (not shown) by the cable 88 and connector 89 (FIG. 2) thereof.

The resolver stator 70 is mounted to the motor stator 30. The resolver stator 70 includes a resolver stator core 71 and resolver stator windings 75 wound onto the resolver stator core 71.

The resolver rotor 80 includes a resolver rotor core 81 fixed onto the shaft 61 of the motor rotor 60 and rotated with the shaft 61. The resolver rotor core 81 is received in a space surrounded by the resolver stator core 71. Preferably, the outer diameter OD1 of the resolver stator core 81 is less than the inner diameter ID1 of the motor stator core 40.

Figure 7:
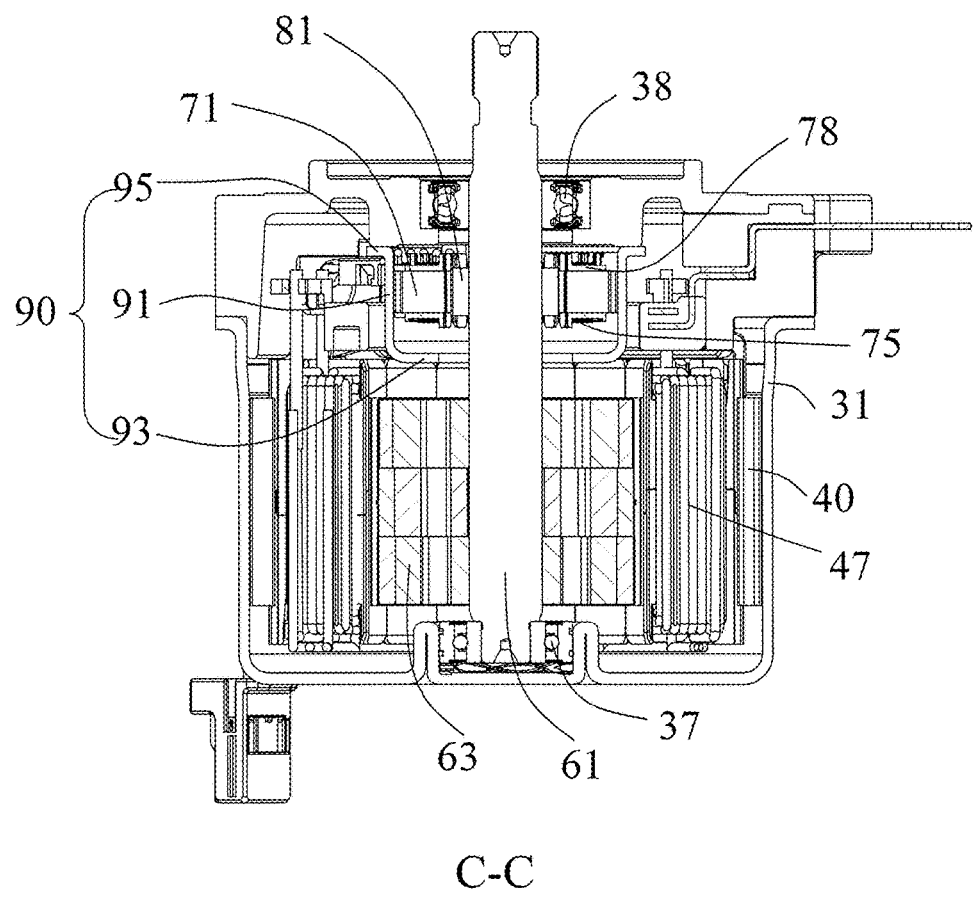
FIG. 7 is a sectional view of the motor of FIG. 4, along C-C.
Figure 8:
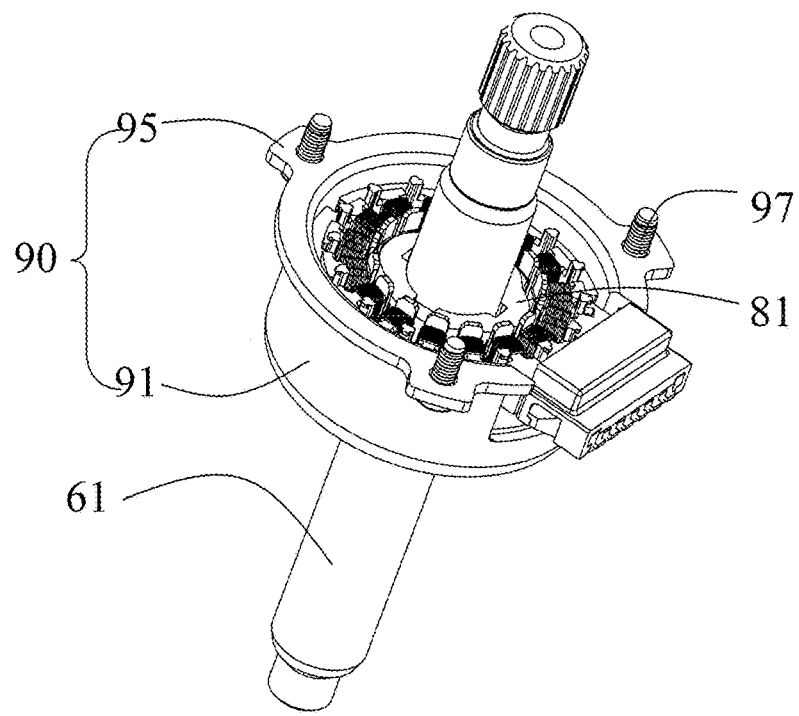
FIG. 8 schematically illustrates a shaft, and a resolver and a shield used of the motor of FIG. 2.
Figure 9:
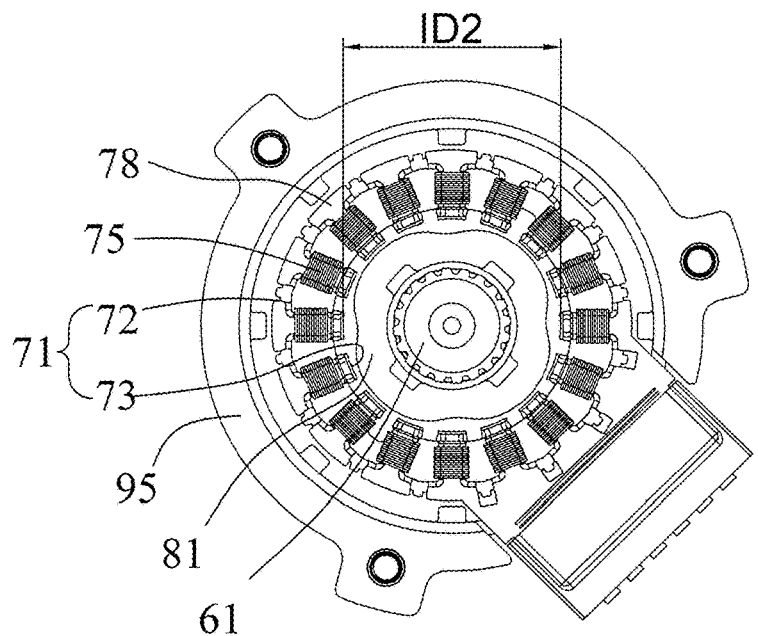
FIG. 9 is a plan view of the shaft, the resolver and the shield as illustrated in FIG. 8.

Referring to FIG. 7 to FIG. 9, the resolver stator core 71 includes an annular yoke 72 and a plurality of resolver stator teeth 73 extending inwardly from the annular yoke 72. The coils of the resolver stator windings 75 are wound onto corresponding resolver stator tooth 73 with an insulated bobbin 78 located there between. In this embodiment, the resolver stator windings 75 are concentrated windings, that is, each coil is wound around one resolver stator teeth 73.

In this embodiment, the resolver stator core 71 is fixed to inner wall of a shield 90, which is cup-shaped in this embodiment. The shield 90 is fixed to the motor stator 30 and includes an tubular portion 91 surrounding the resolver stator core 71 for eliminating or weakening magnetic interference from the motor stator windings 47. In this embodiment, the tubular portion 91 is cylindrical, having a bottom 93 and an opening end at two axial ends thereof, respectively. The bottom 93 includes a through hole for the shaft 61 to pass through. The tubular portion 91 has at its opening end an outward flange 95. The flange 95 is provided with a mounting hole for a fastener 97, such as a bolt or a screw, to pass through. The shield 90 is fixed to the motor stator 30 through the fastener 97.

Preferably, the resolver stator teeth 73 and the resolver stator windings 75 are all received in a space defined by the tubular portion 91.

Figure 10:
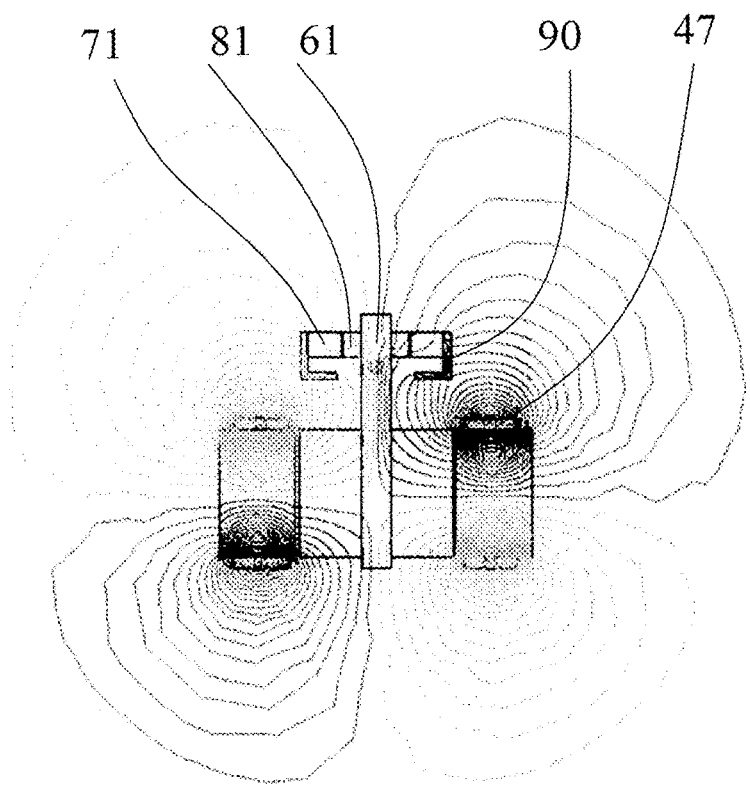
FIG. 10 illustrates the distribution of the magnetic field produced by end-winding current of the stator windings when the motor of FIG. 2 is energized.

Referring to FIG. 10, when the motor stator windings 47 is energized, the end portion of the motor stator windings 47 generates a magnetic field that is tend to interfere with the resolver, particularly with the resolver stator 70. However, under a shielding effect of the magnetic conductive shield 90, the magnetic interference of the motor stator windings 47 to the resolver stator windings 75 is significantly eliminated or weakened.

Figure 11:
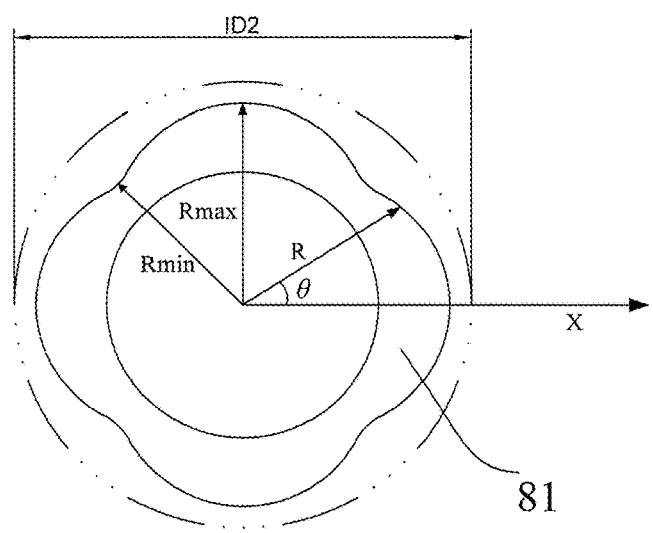
FIG. 11 is a top plan view of the rotor core of the resolver as illustrated in FIG. 8.

Referring to FIG. 9 and FIG. 11, wherein FIG. 11 is a top view of the resolver rotor core 81 along an axial direction. In FIG. 11, the circular dotted line represents the inner diameter ID2 of the annular resolver stator core 71. The two solid lines surrounded by the dotted line respectively represent inner profile and outer profile of the resolver rotor core 81. In this embodiment, the inner diameter ID2 of the annular resolver stator core 71 is about 20 millimeters (mm).

In this embodiment, the resolver rotor core 81 is concentric with the shaft 61. However, the outer radius R of the resolver rotor core 81 is smoothly and regularly changed rather than constant. To be specific, the outer radius R at any one point of the peripheral surface of the resolver rotor core 81 meets:

$$R = R_s - \frac{a}{b + \sin(p\theta)}$$

wherein, $$a = \left[2 + \frac{2(R_s - R_{max})}{R_{max} - R_{min}}\right](R_s - R_{max})$$

$$b = 1 + 2\frac{R_s - R_{max}}{R_{max} - R_{min}}$$

$R_S$ is an inner radius of the resolver stator core 71,
$R_{max}$ is a maximum outer radius of the resolver rotor core 81;
$R_{min}$ is a minimum outer radius of the resolver rotor core 81;
$\theta$ is a resolver rotor angle position of any one point with respect to a start line, e.g., taking X axis as illustrated in FIG. 11 as the start line (0-degree position); and
p is the number of the pole pairs of the resolver rotor core 81.

Figure 12:
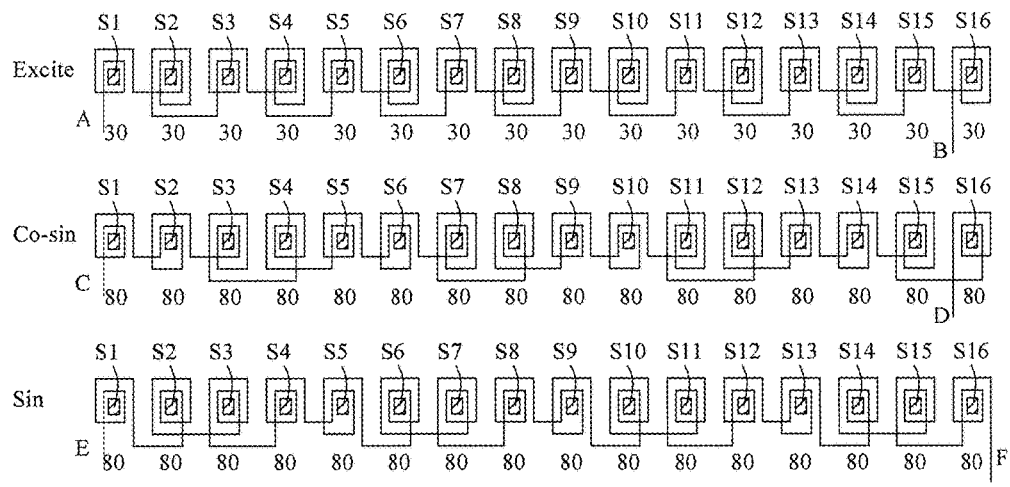
FIG. 12 schematically illustrates the resolver stator windings of the resolver as illustrated in FIG. 8.

FIG. 12 shows a winding scheme of the resolver stator windings 75. In this embodiment, the resolver stator core 71 includes 16 resolver stator teeth S1 to S16, wherein, the first row represents exciting windings Excite, the second row represents a first output windings Co-sin, also called as cosine output winding, and the third row represents a second output windings Sin, also called as sine output winding.

As illustrated in FIG. 12, the first output windings are wound around each of the resolver stator tooth S1~S16 for a first number of turns by a wire. In this embodiment, each coil of the first output windings is wound around a corresponding resolver stator tooth for 80 turns.

The second output windings are wound around each of the resolver stator tooth S1~S16 for a second number of turns by a wire. In this embodiment, each coil of the second output windings is wound around a corresponding resolver stator tooth for 80 turns.

The exciting windings are wound around each of the resolver stator tooth S1~S16 for a third number of turns by a wire. In this embodiment, each coil of the exciting windings is wound around a corresponding resolver stator tooth for 30 turns.

The present invention is not limited to the specific number of turns implemented by this embodiment. Preferably, the third number of turns is less than the first number of turns, and is less than the second number of turns. Preferably, the first number of turns is equal to the second number of turns, and the first number of turns is a multiple of the third number of turns, preferably double or treble.

Preferably, the first output windings are continuously wound by a first wire AB; the second output windings are continuously wound by a second wire CD; and the exciting windings are continuously wound by a third wire EF. In this embodiment, the number of the resolver stator teeth 73 is an even number 2n, wherein n is an integer of greater than one. The 2n resolver stator teeth 73 are divided into n pairs. For example, the adjacent teeth S1 and S2 form one pair, and the adjacent teeth S3 and S4 form another pair. Each pair of resolver stator teeth 73 consists of two adjacent resolver stator teeth 73 such as teeth S1 and S2. For two resolver stator teeth 73 of a same pair, the first output windings are wound in same winding direction. The winding direction as described in the prevent invention refers to clockwise (CW) direction or anti-clockwise (CCW) direction. For example, the first output windings are wound in CW direction around the tooth S1 and S2. The winding directions of the first output windings on a pair of resolver stator teeth 73 is opposite to the winding direction on an adjacent pair of resolver stator teeth 73. For example, the first output windings are wound around S1 and S2 in CW direction, and wound around S3 and S4 in CCW direction.

The second output windings are wound on the resolver stator teeth 73 in a manner similar to that of the first output windings, but offset to the first output windings by one resolver stator tooth. Therefore, for each pair of resolver stator teeth 73 such as the pair consisted of teeth S1 and S2, the first output windings and the second output windings are wound around one of the two resolver stator tooth such as tooth S1 in the same winding direction, and wound around the other one resolver stator tooth such as tooth S2 in opposite directions respectively.

Among the 2n resolver stator teeth (73), for any three adjacent resolver stator teeth such as teeth S1, S2 and S3, the second output windings are wound on the two adjacent resolver stator teeth such as teeth S2 and S3 in a first winding direction such as CCW direction, and wound on the rest one tooth such as tooth S1 in a opposite direction, i.e., CW direction.

As illustrated in FIG. 12, among the 2n resolver stator teeth, the exciting windings on any two adjacent resolver stator teeth are wound in opposite winding directions. For example, the exciting windings are wound on the tooth S1 in CW direction, and wound on tooth S2 in CCW direction, and wound on tooth S3 in CW direction.

Figure 13:
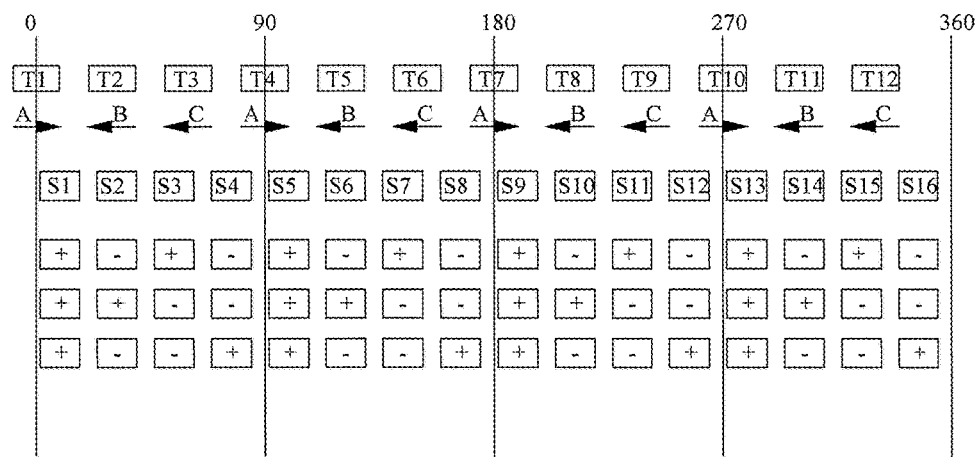
FIG. 13 schematically illustrates the motor stator windings current and the resolver stator windings current as illustrated in FIG. 2.

FIG. 13 shows the relationship between the motor stator windings 47 and the resolver stator winding 75. In this embodiment, the number of the motor stator teeth 43 is ¾ of the number of the resolver stator teeth 73, that is, the motor has 12 motor stator teeth 43 and 16 resolver stator teeth 73.

In FIG. 13, the first row represents 12 motor stator teeth T1~T12, A, B and C below the 12 motor stator teeth T1~T12 respectively indicate three phases of motor stator windings, and arrows near A, B and C indicate phase current directions of end windings of the motor stator windings 47. The second row represents 16 resolver stator teeth S1~S16. The third row represents winding direction of the exciting windings (such as, symbol "+" represents clockwise direction, and symbol "−" represents anticlockwise direction). The fourth row represents the winding direction of the first output winding, and the fifth row represents the winding direction of the second output winding.

The motor stator windings 47 are three-phase windings which are respectively represented by A, B and C. With regard to a permanent magnet synchronous motor using sine wave to commutate stator current, the motor stator three-phase current may be approximately represented as follows:

the current of A phase is $i_A = I\sin(\omega t+\theta)$, the current of B phase is $i_B = I\sin(\omega t+\theta-2*\pi/3)$, the current of C phase is $i_C = I\sin(\omega t+\theta-4*\pi/3)$, It is thus clear that $i_A = -(i_B+i_C)$.

In the above formula, $\omega$ is angular frequency of the three-phase motor stator current, in a unit of radian/second; t represents a current electrifying time, $\theta$ represents a starting phase angle of the A phase current, and a phase position of B phase and C phase lagging behind the A phase is $2*\pi/3$ and $4*\pi/3$ respectively.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

What is claimed is:

1. A resolver comprising:
a resolver stator comprising a plurality of resolver stator teeth and resolver stator windings wound around the resolver stator teeth;
a resolver rotor comprising a resolver rotor core received in a space surrounded by the resolver stator teeth and capable of rotating around a shaft axis;
wherein the resolver stator windings comprises:
a plurality of first output windings wound around each of the resolver stator teeth by a first number of turns;
a plurality of second output windings wound around each of the resolver stator teeth by a second number of turns; and
a plurality of exciting windings wound around each resolver stator teeth by a third number of turns;
wherein the resolver rotor core is in an annular shape, and the outer radius R at any one point of peripheral surface of the resolver rotor core meets:

$$R = R_s - \frac{a}{b+\sin(p\theta)}$$

wherein, $$a = \left[2 + \frac{2(R_s - R_{max})}{R_{max} - R_{min}}\right](R_s - R_{max})$$

$$b = 1 + 2\frac{R_s - R_{max}}{R_{max} - R_{min}}$$

$R_S$ is an inner radius of the resolver stator core,
$R_{max}$ is a maximum outer radius of the resolver rotor core,
$R_{min}$ is a minimum outer radius of the resolver rotor core, $\theta$ is an angle position of the any one point; and
p is the number of pole pairs of the resolver rotor core.

2. The resolver according to claim 1, wherein the third number of turns is less than the first number of turns and/or the second number of turns.

3. The resolver according to claim 1, wherein the first number of turns is equal to the second number of turns.

4. The resolver according to claim 1, wherein the exciting windings are wound on the resolver stator teeth in CW direction and CCW direction alternatively.

5. A motor, comprising:
a motor stator comprising a plurality of motor stator teeth and motor stator windings wound around the motor stator teeth;
a motor rotor rotatably mounted in the motor stator through a shaft; and
a resolver according to claim 1, the resolver stator being mounted to the motor stator, the resolver rotor being fixed to the shaft.

6. The motor according to claim 5, further comprising a shield fixed between the motor stator and the resolver for eliminating or weakening magnetic interference from the motor stator.

7. The motor according to claim 6, wherein the shield comprises an tubular portion surrounding the resolver stator.

8. The motor according to claim 7, wherein the tubular portion comprises a bottom having a through hole for the shaft to pass through.

9. The motor according to claim 8, wherein the tubular portion has an opening end and a flange at the opening end; the flange is mounted to the motor stator.

10. The motor according to claim 9, wherein the flange is provided with a mounting hole for a fastener to pass through to fix the shield onto to the motor stator.

11. A resolver comprising:
a resolver stator comprising a plurality of resolver stator teeth and resolver stator windings wound around the resolver stator teeth;
a resolver rotor comprising a resolver rotor core received in a space surrounded by the resolver stator teeth and capable of rotating around a shaft axis;
wherein the resolver stator windings comprises:
a plurality of first output windings wound around each of the resolver stator teeth by a first number of turns;
a plurality of second output windings wound around each of the resolver stator teeth by a second number of turns; and
a plurality of exciting windings wound around each resolver stator teeth by a third number of turns;
wherein:
the number of the resolver stator teeth is 2n, wherein n is an integer greater than 1;
the 2n resolver stator teeth are divided into n pairs of resolver stator teeth, each of the n pairs comprising two adjacent resolver stator teeth with first output windings wound thereon in a same direction;
for every two adjacent pairs of the n pairs, the first output windings are wound in opposite directions.

12. The resolver according to claim 11, wherein: for the two resolver stator teeth of each pair of resolver stator teeth, the first output windings and the second output windings are wound on one resolver stator tooth in a same winding direction, the first output windings and the second output windings are wound on the other resolver stator tooth (73) in opposite winding directions respectively.

13. The resolver according to claim 11, wherein: for every three adjacent resolver stator teeth, the second output windings are wound on two adjacent teeth of the three resolver stator teeth in a same winding direction, and wound on the rest resolver stator tooth in an opposite winding direction.

\* \* \* \* \*